United States Patent
Klassen et al.

(10) Patent No.: US 8,264,726 B2
(45) Date of Patent: Sep. 11, 2012

(54) PARALLEL PRINTING SYSTEM HAVING FLOW CONTROL IN A VIRTUAL DISK TRANSFER SYSTEM

(75) Inventors: R. Victor Klassen, Webster, NY (US); Jess R. Gentner, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1343 days.

(21) Appl. No.: 10/606,024

(22) Filed: Jun. 25, 2003

(65) Prior Publication Data
US 2004/0196497 A1 Oct. 7, 2004

Related U.S. Application Data

(63) Continuation-in-part of application No. 10/407,564, filed on Apr. 4, 2003, now Pat. No. 7,872,767.

(51) Int. Cl.
*G06K 15/00* (2006.01)
(52) U.S. Cl. .................................... 358/1.16; 358/1.15
(58) Field of Classification Search .................. 358/1.13, 358/1.15–1.16, 1.17; 709/201–203, 208, 709/224, 226; 711/6; 718/100, 102, 104–106
See application file for complete search history.

(56) References Cited

U.S. PATENT DOCUMENTS

| | | | | |
|---|---|---|---|---|
| 5,142,667 A | * | 8/1992 | Dimperio et al. | 358/1.16 |
| 5,652,711 A | * | 7/1997 | Vennekens | 358/1.17 |
| 5,791,790 A | * | 8/1998 | Bender et al. | 400/61 |
| 5,819,014 A | | 10/1998 | Cyr et al. | 395/114 |
| 5,835,691 A | * | 11/1998 | Matsunoshita | 358/1.17 |
| 5,859,711 A | * | 1/1999 | Barry et al. | 358/296 |
| 6,038,033 A | * | 3/2000 | Bender et al. | 358/1.16 |
| 6,101,576 A | * | 8/2000 | Kobayashi et al. | 711/122 |
| 6,785,727 B1 | * | 8/2004 | Yamazaki | 709/229 |
| 6,825,943 B1 | * | 11/2004 | Barry et al. | 358/1.15 |

(Continued)

FOREIGN PATENT DOCUMENTS

JP 09050354 A * 2/1997

OTHER PUBLICATIONS

IBM Technical Disclosure Bulletin NN9308637, "Shared Virtual Disk for Cluster of Processors with Shared Global Cache," Aug. 1, 1993 vol. 36, Issue 8, pp. 637-638.*

*Primary Examiner* — Marivelisse Santiago Cordero
*Assistant Examiner* — Kent Yip
(74) *Attorney, Agent, or Firm* — Fay Sharpe LLP

(57) ABSTRACT

A printing system comprised of a printer, a plurality of processing nodes, each processing node being disposed for processing a portion of a print job into a printer dependent format, and a processing manager for spooling the print job into selectively sized chunks and assigning the chunks to selected ones of the nodes for parallel processing of the chunks by the processing nodes into the printer dependent format. The chunks are selectively sized from at least one page to an entire size of the print job in accordance with predetermined splitting factors for enhancing printer printing efficiency. The operating of the printing system includes a method for parallel processing of a print job with a plurality of processing nodes into a printer-ready format for printing the print job, wherein the processing nodes communicate with a virtual disk transfer system and control usage thereof by monitoring available space in the virtual disk transfer system.

20 Claims, 5 Drawing Sheets

U.S. PATENT DOCUMENTS

| | | | |
|---|---|---|---|
| 7,046,391 B1 * | 5/2006 | Barry et al. | 358/1.9 |
| 7,161,705 B2 * | 1/2007 | Klassen | 358/1.18 |
| 2003/0184800 A1 * | 10/2003 | Ohara | 358/1.15 |
| 2003/0193683 A1 * | 10/2003 | Motamed et al. | 358/1.13 |
| 2003/0231330 A1 * | 12/2003 | Westervelt et al. | 358/1.13 |
| 2004/0008359 A1 * | 1/2004 | Christiansen | 358/1.13 |
| 2004/0114170 A1 * | 6/2004 | Christiansen et al. | 358/1.13 |
| 2004/0136033 A1 * | 7/2004 | Glaspy et al. | 358/1.18 |
| 2004/0169885 A1 * | 9/2004 | Mellor et al. | 358/1.16 |
| 2004/0196470 A1 * | 10/2004 | Christiansen | 358/1.1 |
| 2004/0196496 A1 * | 10/2004 | Klassen | 358/1.15 |
| 2004/0243934 A1 * | 12/2004 | Wood et al. | 715/517 |

* cited by examiner

PARALLEL PRINTING SYSTEM HAVING FLOW CONTROL IN A VIRTUAL DISK TRANSFER SYSTEM

This application is a continuation-in-part of U.S. patent application Ser. No. 10/407,564 now U.S. Pat. No. 7,872,767, filed in the name of Klassen, on Apr. 4, 2003.

FIELD OF THE INVENTION

The subject invention relates to printing systems, their architecture and processing steps and, more particularly, to producing electronic images in a manner to drive digital printers more efficiently and faster.

BACKGROUND OF THE INVENTION

Generating print-ready documents to be printed by a printing system involves acquiring the information (content, graphics, production specs, etc.) required to view, process and output the desired document in an electronic form understandable by a print engine. Such systems can range from those that are simple and modestly expensive such as are well known to consumer users of personal computer systems, up to commercial printing systems that are capable of generating in the range of one hundred pages per minute in full color. All systems, though, have a high level objective of printing faster.

There are three general approaches which have been applied in the past for accomplishing this objective. First, faster serial processing methods suggest optimizing the software and using faster and more expensive processors. Second, job parallel processing sends separate jobs to separate systems and then prints them on a common printer. Third, Portable Document Format ("PDF") based page parallel systems convert the job to PDF, and then split the PDF file into pages which are converted to print ready form on multiple independent processors, with the job being printed on a common printer. Software optimization has its limits and faster processors are also limited by currently available technology. Job parallel processing results in poor single job performance, unpredictable job time and reduced throughput when there is only one long job in the queue. The existing PDF-based solutions are slow due to their need to often convert from a different input language into PDF and then write the PDF file into an input spool disk. Page parallel processing has suffered from the inefficiencies of a throughput disadvantage because per job overhead occurs on a per page basis.

A more detailed description of a job parallel system is in U.S. Pat. No. 5,819,014 which describes a printer architecture using network resources to create a "distributed" printer controller or translator. By distributing the translators across the network, print jobs may be processed in parallel. Each job is formatted in the system in a particular data type comprising a Page Description Language ("PDL") such as a PostScript file, ASCII, PCL, etc. A distributed set of the translators is used for each data type, the translators each comprising a plurality of CPUs to simultaneously rasterize each data type. In real time operation, each translator on the network can formulate the rasterized image which is then fed over the network to the print engine. Job parallelism increases the flexibility of the printing system by allowing slow jobs to be processed while quicker jobs are completed and printing. However, it can be easily appreciated that where the jobs require substantially different processing times, waits will necessarily occur and overall system efficiency will suffer.

A well known commercially available system exploiting page parallelism is Adobe® Extreme. In this system the data input for a print job is normalized into a PDF format and stored on disk. The PDF format is essentially page independent guaranteed and thus facilitates segregating the job into page units for page parallel processing. A "sequencer" processing node takes the PDF jobs off the disk and writes them back onto a disk again a page at a time as individual files, one file per page. Rasterizing image processing nodes (RIP nodes) then convert the files into a print-ready form acceptable by a print engine. It is important to note that in terms of processing efficiency, Adobe Extreme must access the disk twice, thus slowing the system down, and that the RIP nodes can only process a file consisting of a single page. Of course, an entire job may be limited to one page, but for purposes of setting the stage for the subject invention, when a job is comprised of several pages, Adobe Extreme must sequence it to individual pages only.

Accordingly, in the continuing need for improving efficiency and speed in printing systems, there is a need for a system which is not limited to mere job or page parallelism and that can facilitate control and data flow of a print job to the printing system that will obviate multiple access to a storage disk for any single job. The subject invention satisfies these needs and thus overcomes the problems specified above, as well as others.

BRIEF SUMMARY

The subject invention comprises a unique implementation of parallelism for which we can find no satisfactory defined term, and thus functioning as our own lexicographer, we will refer to this concept as "chunk" parallelism. Chunk parallelism is an intermediate level of parallelism between job parallelism and page parallelism. A chunk is a collection of rasterized data consisting of at least one page and not more than one job. A chunk may be an integer number of pages less than an entire job but has a startup overhead occurring on a chunk basis as opposed to a per page basis.

The printing system of the subject invention includes a printer, a plurality of processing nodes, each processing node being disposed for processing a portion of a print job into a printer dependant format, and a processing manager for spooling the print job into selectively sized chunks and assigning the chunks to selected ones of the nodes for parallel processing of the chunks by the processing nodes into the printer dependant format. The chunks are selectively sized from at least one page to an entire size of the print job in accordance with predetermined splitting factors for enhancing page processing efficiency. The splitting factors comprise either a threshold boundary of a number of bytes or a threshold boundary of a number of pages. An end of one of the chunks comprises a next page boundary subsequent to the crossing of one of the threshold boundaries. The threshold boundaries for the number of bytes and the threshold boundary for the number of pages are determined for tending to achieve an equal amount of processing work between the processing nodes per boundary, and for keeping multiple processors busy on a given job, respectively. In accordance with another aspect of the present invention, multiple PDLs are accommodated. Dependant upon a determination of the language of the print job, a plurality of language specific splitting processors are provided for effecting the splitting of the print job for the determined language, whereby the conversion of a plurality of print job languages into a single predetermined standard language is obviated.

In accordance with another aspect of the present invention, the processing nodes comprise means for processing an assigned one of the chunks when the processing manager starts sending the assigned chunk to the respective processing node whereby waiting for receipt of the entire chunk before RIP processing starts is obviated.

In accordance with another aspect of the present invention, the system comprises a supervisor processor for estimating the work time required to process a print job based upon selected data determined from the splitting of the print job and for load balancing the print jobs across the processing nodes.

An advantage of the subject invention is parallel RIP node processing functionality with granularity ranging from page to job parallelism.

Another advantage is page/chunk parallel RIP node processing while accepting multiple languages as input without having first to convert such input languages to a common form, e.g., converting a PDL language to PDF and splitting PDF on page boundaries as per Adobe® Extreme. Omitting such a conversion step enhances the system efficiency and speed.

Yet another advantage is a memory management scheme wherein the most recently written portions of the memory buffers that are used both for input and output on the RIP nodes are written to disk when the buffers overflow. This is distinguishable from the conventional approach of using least recently used memory buffer portions. Because the buffers are accessed in a first in-first out manner, system processing results in significantly less latency in accessing data.

In accordance with another aspect of the present invention, there is provided auto-discovery of hardware and software resources at startup time, to optimally configure the page parallel RIP system.

In accordance with another aspect of the present invention, there is provided a method of determining a degree of parallelism, according to criteria such as: determining the quantity of hardware available to the system; and calculating the degree of parallelism from the quantity of hardware.

In accordance with another aspect of the present invention, means are provided for display of information on an operator interface regarding the degree of parallelism and means for altering the extent of parallelism.

In accordance with another aspect of the present invention, there is provided a method of auto-recovery in serial mode.

In accordance with another aspect of the present invention, there is provided a method for determining that the splitting process failed, and in response, processing the job without concurrent processing.

In accordance with another aspect of the present invention, there is provided enablement of concurrent processing of unprotected Postscript jobs, wherein the state of all parallel RIP nodes may be altered to an altered state, and the altered state may be used while concurrently processing a job.

In accordance with another aspect of the present invention, there is provided queue-level control over concurrent processing, wherein an operator is provided the ability to select serial processing of certain jobs while other jobs are processed concurrently, and vice versa.

In accordance with another aspect of the present invention, there is provided flow control of job processing according to criteria such as available memory buffer space, and control of splitting a chunk of a job based on the amount of available memory buffer space.

Other advantages and benefits of the present invention will become apparent to those of ordinary skill in the art upon reading and understanding the following detailed description of the preferred embodiments.

DESCRIPTION OF THE PREFERRED EMBODIMENTS

While the present invention will hereinafter be described in connection with preferred embodiments thereof, it will be understood that it is not intended to limit the invention to those embodiments. On the contrary, it is intended to cover all alternatives, modifications and equivalents as may be included within the spirit and scope of the invention as defined in the appended claims.

The present invention addresses the continuing need for faster printing systems—particularly systems where every page can be color and different. The system exploits parallelism to facilitate its speed, but especially an implementation of parallelism not known in prior art printing systems which had been limited to job parallelism or page parallelism. The subject invention uses an intermediate level of parallelism herein defined as "chunk" parallelism. A chunk of print job data is intended to comprise a collection of rasterizable data of at least one page and not more than one job. Job parallelism would occur when a job is smaller than the maximum chunk size, page parallelism occurs when the maximum chunk size is 0 (bytes/pages).

Figure 4:
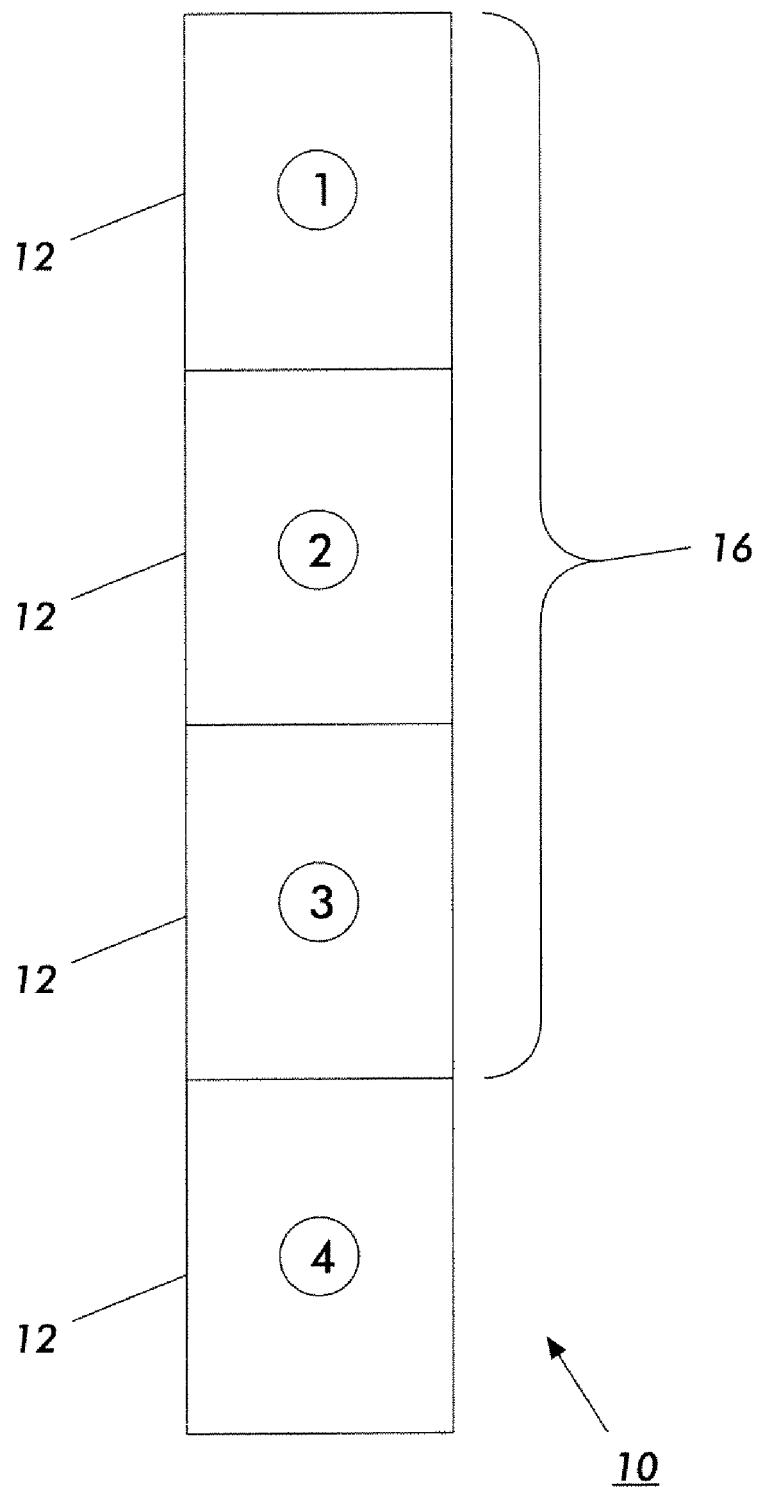
FIG. 4 is a schematic representation of a print job for showing page and possible chunk boundaries.
Figure 5:
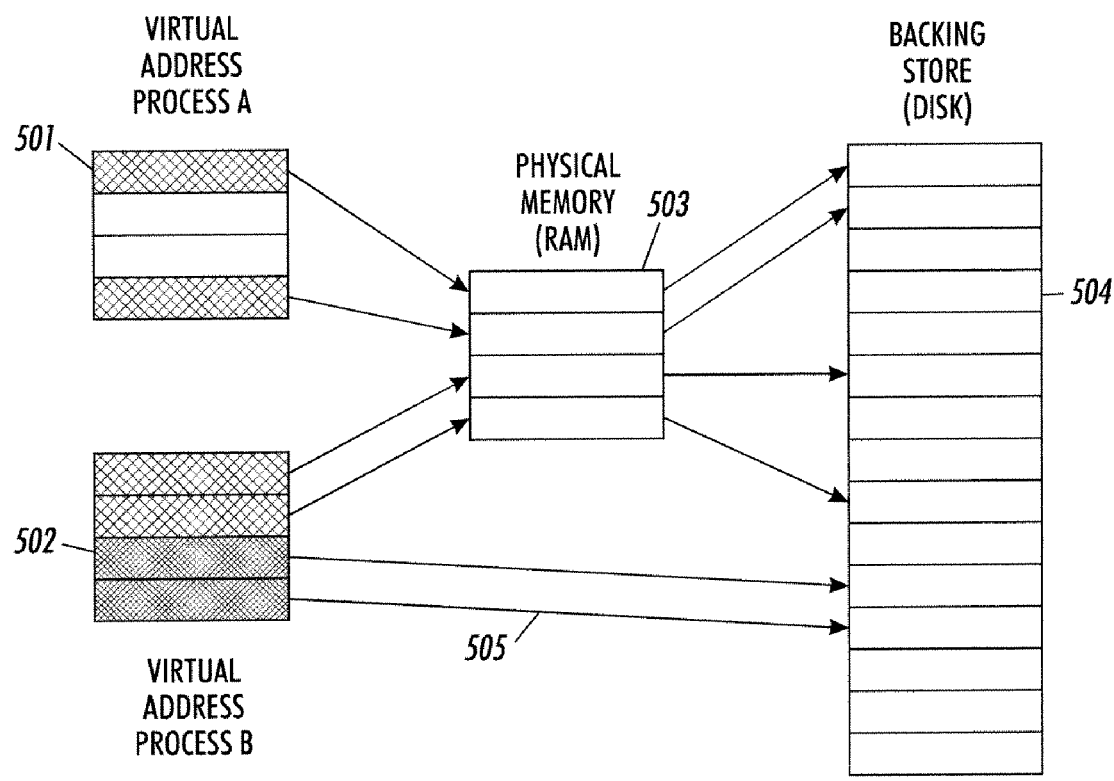
FIG. 5 is a representation of the paging in and paging out of chunks of data from the virtual disk transfer system.

With particular reference FIG. 4, it can be seen that a particular print job 10 is comprised of multiple pages 12 and several of the pages can be associated together into a "chunk" 16 for rasterizing by an assigned RIP node as will hereinafter be more fully explained. Prior art systems could only rasterize in a single node the entire job 10 or the pages 12 individually, but never an associated set of pages within a particular job.

Figure 1:
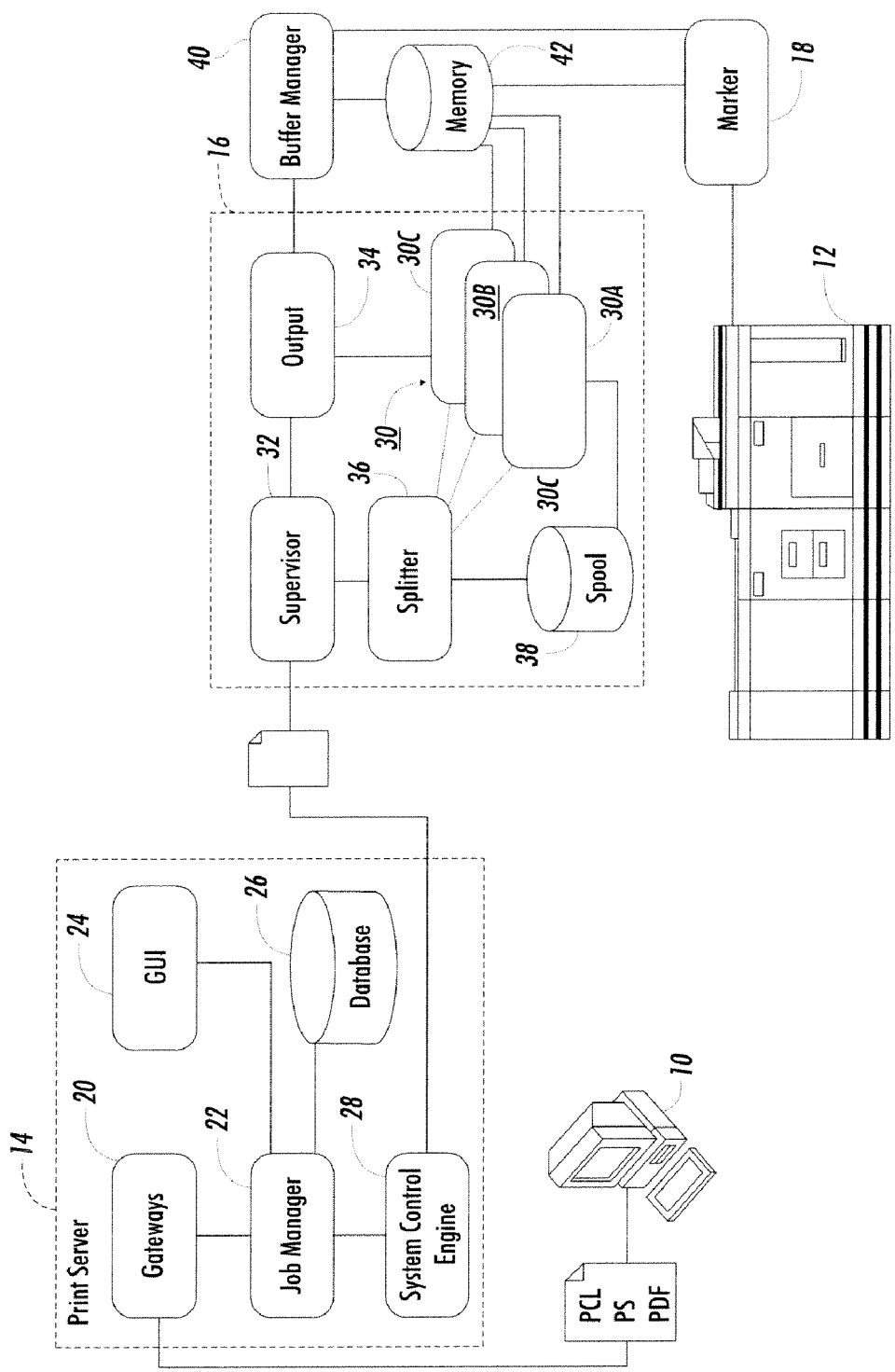
FIG. 1 is a high-level systems view of a printing system incorporating the present invention.
Figure 2:
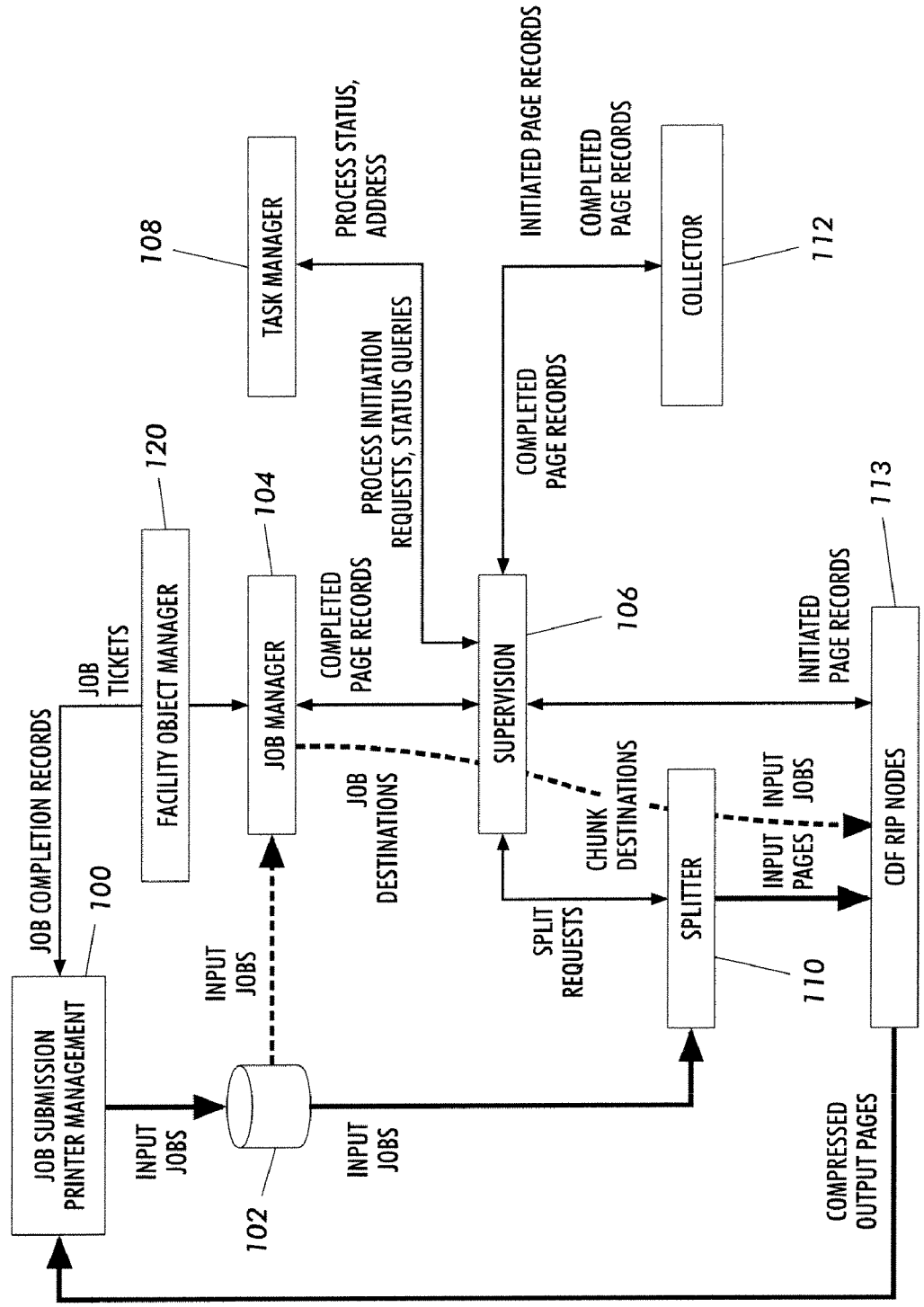
FIG. 2 is a block diagram illustrating the architecture for control and data flow of the printing system of FIG. 1.
Figure 3:
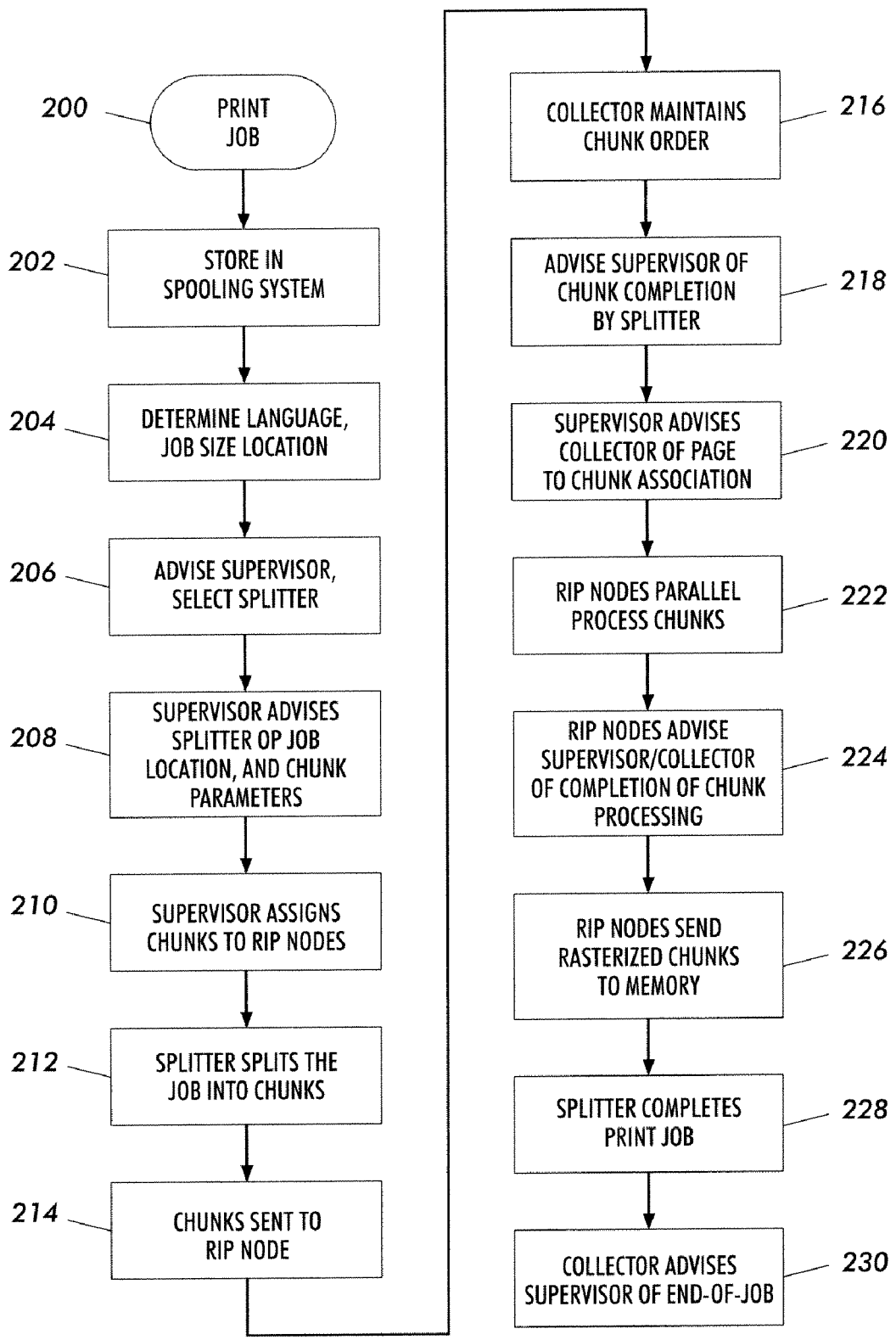
FIG. 3 is a flowchart summarizing a method for processing a print job in accordance with the present invention.

With particular references to FIGS. 1 and 2, the invention is comprised of several novel features, one of which is a chunk parallel page rasterization system. The system may be implemented as a distributed system, or a centralized service on a single multiprocessor machine, for driving a printing apparatus.

FIG. 1 is a high-level systems view of a printing system constructed according to the present invention. While the below description of a preferred embodiment will refer to a commercially-available product, Xerox DocuSP, it will be appreciated that the claimed invention shall not be limited to such a specific implementation.

Jobs comprising image data to be printed are submitted from a job submission client 10, which of course could be any of a large number of computers on a network (not shown). The jobs from the clients 10 are ultimately intended to be printed on a high-speed digital printing apparatus 12. Interposed between the client 10 and the printing apparatus 12 is a print server indicated as 14, one or more parallel RIP subsystems generally indicated as 16, a buffer manager 40 and a marker 18. In the preferred embodiment of the present invention, the print server 14 includes certain elements of the commercially-available DocuSP. Buffer manager 40 collects the image data from subsystem 16 until marker 18 is ready. Marker 18 is intended to represent the software, which is directly operative of the printing apparatus 12, which provides hardcopy output images.

Turning first to print server 14, jobs submitted from client 10 pass through a gateway 20, which interacts with a job manager 22. The job manager 22 is the interface of the print server to the user, and would typically be apparent to the user through a screen on the clients computer, as indicated by graphical user interface (GUI) 24. The job manager 22 also interfaces with a database 26 which includes software that would, for example, enable the client to select, for example stapling, duplex, output, and other options. The job manager 22 further interfaces with a system control engine 28, which directs each job to the subsystem 16, and interfaces with marker 18 to exercise some control over the hardware in printing apparatus 12, such as staplers, output trays, and feeders.

The subsystem 16 is responsible for taking image data in a PDL and for generating the decomposed image data to be printed on the printing apparatus 12. The subsystem 16 includes a plurality of independently-operating RIP nodes generally indicated as 30, and specifically divided into independent RIP nodes 30A, 30B, 30C (For purposes of this description, the PDLs discussed in the present embodiment can be generalized into plural "image formats," such image formats including not only PDLs but also other image and information formats such as, but not limited to, TIFF, ASCII, PDF, and facsimile formats.)

To enable parallel processing of page images from the RIP nodes 30, there is provided a supervisor 32, an output section 34, and a splitter 36. The function of splitter 32 is to direct the image data from a incoming job ultimately submitted from client 10 and distribute it to the various RIP nodes 30. These services will ultimately divide the data for the multi-page document into component subsets of data, each subset of data corresponding to one chunk to be printed.

The present invention provides a data queuing capability, the functionality of which is carried out by the subsystem 16 in coordination with a buffer manager 40. Buffer manager 40 interacts with the subsystem 16 and a memory indicated as 42. As is familiar in the art of network printing, it is typically necessary to provide such a memory 42 to temporarily retain decomposed page image data emerging from one of the decomposers, until such time as the data for the particular page image is required by marker 18 for immediate submission to printing apparatus 12.

Accordingly, with reference to FIG. 2, and embodiment of an improved printing system may be constructed according to the present invention to include a spooling system that provides jobs to a parallel RIP subsystem, wherein the parallel RIP subsystem includes a splitter that breaks jobs into chunks on page boundaries, possibly containing more than one page per chunk; plural RIP nodes 30 that operate in parallel to convert the chunks to print-ready format; supervisory functionality that provides intelligent scheduling of the plural RIP nodes 30, and an output section to provide the appearance of fast serial operation to the rest of the system (i.e. although chunks may be processed to completion according to a re-ordered sequence, they are reported as finished in order). The plural RIP nodes 30 compress the print-ready pages to reduce downstream bandwidth requirements; for example in certain implementations, such compression may employ compression according to the XM2 protocol.

The contemplated improved printing system is described herein as a "chunk parallel" system. Hence the system may be implemented in symmetric multiprocessor (SMP) or in distributed multiprocessor configurations. In either configuration, a key feature is virtual disk (VDISK) 38, which is used for temporary storage, both of split chunks and print-ready pages. VDISK is similar to RAM disk with some specific features designed for performance in the contemplated chunk parallel system.

The subsystem 16 includes a language identifier that selects the method by which the print job is split into chunks. For languages that permit it, the chunk size may be determined by certain criteria such as an estimate of the amount of processing required for the composition. The trade-off between small chunks that offer reduced job time, and large chunks that offer improved throughput, is managed by job priority. In addition to the language identifier, the subsystem 16 preferably includes a splitter 36 for each language supported by the printing system. Accordingly, the plurality of RIP nodes are then capable of translating incoming PDLs to a print-ready form, which is preferably compressed. The output section 34 includes a collector function that reorders chunk completion messages so that chunks appear to be completed in the same order they appeared in the original jobs. The supervisor 32 operates to estimate factors such as the time required to process a job; these factors may be based on statistics gathered as the splitting process is carried out, and uses such information to load balance the processing carried out across the plurality of RIP nodes 30.

The system architecture, control and data flow and processing steps may be understood with reference to FIG. 2, as follows.

When a job 200 arrives from a client at job submission/printer management node 100, the input spooling system saves 202 the content either in memory or on disk 102, and the language is determined 204. Languages include PostScript, PDF, PPML, unstructured ASCII text, and others as needed.

The input spooling system 102 notifies 206 a processing manager assembly for effecting the necessary supervisory functions (shown in FIG. 1 as job manager node 104, supervisor node 106 and task manager node 108), by indicating the language to job manager node 104. The job size (if it has been fully received), and how/where to find the data is also determined 204. Any of several well-known mechanisms may be used to communicate the location of the data, including a network filename for a distributed system, or a memory address for a centralized system.

The supervisor node 106 selects 206 a splitter 110 using the determined language to select which splitter(s) is/are capable of splitting the job. A plurality of splitters is intended in a large system, in which case the supervisory function selects a splitter based on the estimated amount of pending work on all splitters' queues. The supervisor 106 also notifies the collector 112 that a new job exists in the system, and tells the spooling system 102 what the unique identifier for the new job is within the system. The supervisor node 106 generates unique identifiers so that it may communicate with multiple input spool systems without having their unique identifiers conflict.

The supervisor node 106 then informs 208 the selected splitter 110 where to find the data (the supervisor does not look at the data), and the splitter 110 may begin splitting the file as soon as it is ready. The splitter 110 is multithreaded, so it can receive messages describing input jobs while it is splitting previous jobs. The supervisory function also informs 208 the splitter 110 of the chunk parameters comprising the defining threshold boundaries of a chunk (maximum page count, maximum byte count).

The splitter 110 requests chunk destinations. The supervisor assigns 210 chunks to RIP nodes implementing a Common Decomposer Facility ("CDF") 113 using estimates of the amount of work pending on the nodes. (A CDF provides translation for PDL form to print-ready form). Estimates are calculated based on the total amount of work assigned to a physical RIP processor, as a given physical node may have both a RIP and a splitter running on them. The supervisor node 106 only provides a small number (such as 3) of destinations to the splitter 110 to allow it to optimize its estimation of the amount of work assigned to each physical processor.

The splitter 110 splits 212 the job into chunks. At each page boundary the splitter 110 checks to see whether the page count or byte count has been exceeded, and if either one has, it finishes that chunk. As it splits a job into chunks, it sends 214 the chunk to the next destination it has received from the supervisor node 106. It writes the chunk into either a CDF memory or the disk associated with the node that the destination assigned by the supervisor indicates. In the preferred embodiment the data for a chunk is written into the memory, rather than disk. The splitter 110 uses a separate thread to copy the data to a RIP node, so that it can continue splitting without being limited by network transfer time or the speed of the receiving node.

After the splitter 110 writes the first page of a chunk, it notifies the supervisor node 106, which, in turn, notifies a RIP node, and the collector 112. The collector maintains 216 a set of jobs in the system, and for each job, a list of chunks in order of arrival.

A RIP node has multiple threads or processes, one of which handles the receiving end of the data transfer. The splitter 110 and the RIP nodes 113 use some means of communicating, such as by sending a separate message, whether or not the splitter 110 has completed 218 writing that chunk. Or the supervisor node 106 could send a message to the RIP nodes 113 when it receives notification from the splitter 110. When a RIP node attempts to read beyond the end of the data written thus far, it blocks. If it attempts to read beyond the end of data written when the splitter 110 has finished the chunk, it receives an end of file signal.

In a preferred embodiment data transfer uses an intermediary process, called VDISK (for virtual disk), which appears to both the sending and receiving processes like regular disk, with the ability to open files and directories, read and write files, etc. Unlike regular disk, VDISK provides the functionality that it may include a remote transfer (if the receiving process is on another node in a networked system), and because it knows whether the sending process has "closed" the file, it knows whether the receiving process should receive an end of file signal or be blocked on an attempt to read beyond the last data written. VDISK is implemented by a process providing a shared-memory interface for the receiving process, for local accesses. The VDISK implementation provides for more data being written to VDISK than fits into memory 504 by paging out blocks 505 of data in a most-recently-used order 502, because the least recently used (written) pages 501 will be needed (read) soonest. Other than providing a transparent networked file system interface, blocking reads before end of file, and most-recently-used paging, VDISK operates much like a conventional RAM disk 503.

When the splitter 110 completes a chunk it sends a message to the supervisor informing it of which pages have been written; the supervisor informs 220 the collector of which pages to associate with a given chunk.

After the splitter 110 has written several chunks, multiple RIP nodes 113 operate 222 in parallel, writing pages of print ready data. Preferably this data is written 226 in compressed form, such as mixed raster content files, to internal memory data buffers (such as provided by VDISK).

As a RIP node completes a chunk, it sends 224 a message to the supervisor, which passes the message on to the collector 112. The collector notes that this chunk is complete, and as long as it finds the first in the list for this job is complete, it removes the first in the list, and informs the supervisor node 106. The supervisor node 106 notifies the input spooling system of the location of the output data for that chunk.

When the splitter 110 completes 228 a job, it informs the supervisor node 106, which informs the collector 112 to expect no more new chunks for that job.

When the collector 112 receives the last message from the supervisor that a RIP node has completed a chunk, it knows it because that job has an associated end-of-job message, and the list of chunks becomes empty when that chunk is removed from the list. The collector 112 then informs 230 the supervisor node 106, which informs the input spooling system that the job is complete.

The compressed output pages for the completed output job are returned to printer management 100 for transmission to a print engine.

Parallelism is enhanced by the system architecture in that several of the processing nodes of FIG. 2 are intended to be multiple nodes acting in parallel. More particularly, such parallel processing nodes include job submission/printer management 100, job manager 104, task manager 108, splitter 110 and CDF 113.

Chunk size is optimized to trade off individual job speed against throughput. The time that a RIP node requires to process a chunk includes a small constant amount of startup time, as well as time that is generally proportional to the amount of data in the chunk. The constant of proportionality relating the amount of data to the processing time varies with the kind of document or documents being processed; however in a typical shop it only changes relatively slowly with time as the mix of jobs changes. If every chunk is one page long, the startup time is spent on every page, and the total processing time will include N times the startup time plus the time it takes to process all the pages. In a serial system the total processing time would be simply the startup time plus the time it takes to process all the pages. Clearly the throughput of the parallel system would be better with larger chunks. Contrariwise, if jobs are broken into very large chunks, the startup cost becomes negligible, however the chunks of any given job are likely to occupy only some of the RIP nodes. If there is only one job in the system, the remaining nodes are left idle. Even if there are multiple jobs in the system, the time between submission and completion of any one job is longer because the work is not well balanced across nodes. Considering the extreme case where chunks are as large as the jobs themselves, it is obvious that the time an individual job spends in the system is no faster than in a serial system.

Pages to be processed span a range of complexity. On typical systems, there is a factor of 20 or more between the processing time of the easiest pages and the hardest pages. The simplest predictor of page processing time is the number of bytes in a page. If the page is a hard page, the startup overhead for that page is very small compared to the total time spent on that page. If the page is an easy page, the startup overhead may be considerable compared to the time spent on that page. For this reason, the criterion for determining chunk size takes into account both total bytes and total page count. Easy pages are grouped together to make chunks that are large enough to keep the startup overhead down, but small enough to spread the job over multiple RIP nodes. Short, easy jobs may not be spread over multiple RIP nodes, but since they are short and easy, there is no need to accelerate them further.

For each type of input, splitting may be performed in a unique manner. One example is PDF, which comes in the form of a file containing multiple objects, along with a cross reference table indicating the locations of the objects. One type of object is the stream object, which contains all of the marking information—information pertaining to putting marks on paper. Another type is the indirect reference object, which is the equivalent of a pointer. Yet another is a dictionary, which provides a set of key-value pairs. By examining the information contained in a special dictionary, along with the information in the cross reference table, it is straightforward to find all of the objects in a file associated with each of its pages, and write out a separate PDF file for each of the pages. In a preferred embodiment, the splitter 110 calculates some statistical information such as the sizes of the streams for each page, and passes that information to the supervisor for use in estimating the work associated with that page.

Another example is DSC-PS, Document Structuring Convention conformant PostScript. This format contains information needed for all pages at the beginning of a file, and then information specific to each individual page, in sequence thereafter. Some creation tools, such as QuarkXpress, mix information needed for later pages where only information specific to an individual page should appear, however it is possible to divide it into individual pages. Any splitter 110 that can split a document into individual pages can readily concatenate several pages rather than using only one page per chunk, assuming it accepts an input format that supports multiple pages.

Some languages, such as database-mode VIPP (Variable Information Postscript Printware), are not readily split on page boundaries. In this case, a series of records comprise a job, and each record describes a single document, which may be several pages long. Typically this is intended for mass customized mailing, and each document within a job is intended to go in a separate envelope. For such a language, the splitter 110 would divide the job at document boundaries.

Adaptive Scheduling

Splitters 110 preferably collect statistical information about each page they split. For a PDF splitter, this includes the total size of the page, and how many bytes are in streams. It could also include data regarding the types of compression used for the streams (PDF streams are typically compressed), and the distribution of sizes. For a DSC-PS splitter it includes at least the creator name and the size in bytes of the page. If the creator explicitly indicates the number of bytes in images (via %%BeginData/%%EndData constructs) the number of bytes in images is included as a separate statistic. Another statistic could be the total number of pages for the split portion of the print job. This information is forwarded to the supervisor node 106, which uses it to calculate an estimated time that it expects a RIP node to spend on that page or chunk. When a RIP node completes a page, it informs the supervisor of how long it actually took. The supervisor uses the actual time along with the statistics to build a model of processing time as a function of the various statistical information it receives. As more RIP nodes complete more pages, more statistical information is available, and the model is refined. From this refined model, and knowledge of what work is already scheduled on each RIP node, the supervisor can predict how long a node will take until it is free to begin new work (i.e. work not yet assigned to a RIP). The RIP node expected to be available soonest will be the next one scheduled when a request for a destination from a splitter is satisfied. The supervisor node 106 only satisfies a small number of destination requests in advance, since the scheduled chunks that have no statistics yet associated with them only add uncertainty to the estimation. In addition, estimates for those chunks that have statistics contain a measurable amount of error. The statistics do not need to be collected from the same print job, i.e., from a prior portion of the same job.

Various approaches to building a model are possible. One possibility is a neural network. Another possible implementation is to divide the input pages into groups according to some subset of the statistical information, such as the creator (in the case of DSC-PS), or the distribution of stream sizes (for PDF), and then for each group calculate a linear model giving the RIP node time as a function of one or more other statistics (such as the size of the page in bytes). Least squares estimation techniques (e.g. as found in the public domain package LAPACK) are satisfactory for constructing parameters of linear models.

Job Interrupt/Resume

When a job is interrupted, typically to let a higher priority job pass through the system, the supervisor informs the RIP nodes 113 that they should not start on any new chunks for the current job. The RIP nodes 113 may interrupt what they are doing and save state, but if the chunks are reasonably small, the higher priority job will be serviced soon enough if they complete the chunks they are currently processing. The supervisor node 106 stops all splitters currently operating by not satisfying their requests for destinations. This causes the splitters to pause. When the high priority job arrives (the reason for the interrupt), the supervisor sends it to a different splitter (already running, but paused because it had not received a source job), and provides it with destinations until it completes the job. The high priority job passes through the system with very little of the system needing to be aware that anything unusual is happening.

Priority Based Chunking

Throughput is maximized if there are always enough jobs in the input queue to keep all of the nodes busy operating on different jobs (effectively infinite chunk sizes). This is because there is some unavoidable overhead incurred when splitting a job into chunks (the overhead is at a maximum for single page chunks). Maximizing individual job speed is affected by several factors: resource availability, split overhead, chunk parallelism, load balancing, and scheduling latency.

As is common with all jobs sent through the system, chunking parameters are chosen to decrease split overhead and increase chunk parallelism and load balancing. Increasing parallelism tends to be more important than decreasing overhead. Chunking parameters are decreased as the expected number of pages in a job decreases. At the extreme, those jobs that are expected to have less pages than RIP nodes are forced to go through the system with chunking parameters 0 (single page chunks only). For other jobs, a good compromise is to select chunking parameters that keep the overhead to five or ten percent of the RIP time. This provides generally satisfactory job turnaround while having only a small impact on throughput. Load balancing limits the practical number of pages in a chunk. A smaller number of pages per chunk decreases the likelihood of having to wait on a less than optimal number of RIP nodes to finish their last chunk of the job.

A priority job is given unfair advantage when compared to other jobs in the system. A priority job may be allowed to skip ahead of other jobs to decrease the latency associated with scheduling the job on one of the available splitters. In addition, the assigned splitter 110 may receive an unfair number of chunk destinations so that more RIP time is spent processing the priority job. In some cases the other jobs in the system may be suspended (or cancelled), allowed to resume only after the priority job finishes.

Job Pipelined/Overlapped Processing

The queuing system stages jobs through a modified 'InProgress' stage. While normally only one job may be in progress, this permits multiple jobs to be in progress. Jobs enter the in progress stage as soon as their language has been identified, and are released to the parallel system immediately. They remain in the in progress stage until a) they are complete, and b) no earlier submitted jobs in the InProgress stage remain. If a job faults in any manner, the error is reported when the job leaves the InProgress stage. The parallel system (esp. the splitter 110) normally does not begin a job until the previous job has been split, however this is not a requirement, and in a large system with multiple splitters and many RIP nodes, multiple jobs may be split simultaneously. Overlapping the split stage of the next job with the RIP of pages of the previous provides a substantial improvement both in job time and in throughput over a pure page- or chunk parallel system. In an optional mode, the system may release jobs from the InProgress state as soon as they are complete, however this potentially violates the first-in-first-out behavior expected of a printing system, and may result in complications for the operator.

Auto-Discovery of Hardware Resources at Boot Time

Parallel chunk processing when carried out according to the present method is contemplated as requiring a plurality of processing units, sufficient memory, and sufficient compression resources. Accordingly, there is contemplated provision for performing auto-discovery of hardware resources which is preferably performed at a predefined, early stage of operation, such as a system boot. One benefit of such determination of the operable complement of hardware resources is that system changes, such as upgrades or other equipment changes, are detected and additional resources are used to the fullest extent to optimize parallel chunk processing.

For example, whenever the system is booted its initial operation is set to check Parallel RIP eligibility. Certain predefined prerequisite conditions may be checked in order to allow parallel RIP node operation: for example, the combination of a valid license in conjunction with a minimum processor count. A configuration file may be defined, for example, to include the latter in a setting known as value_min_CPUs. If the prerequisite condition(s) is not met, N-WAY (a limiting value indicating the number of active RIP nodes) may be forced to one and parallel RIP processing is disabled. Also at boot time, and when parallel RIP is enabled, the system checks the hardware, which in an SMP implementation would include determining such configuration factors as the number of installed processors, compressor cards, and so on; the amount of memory; and the available swap capability. Given a system with N processors, the RIP rate may be seen to increase linearly with the number of RIP nodes until the number of RIP nodes exceeds $\alpha N$, for some integral value of $\alpha$. (Although this is dependent on the revision of the RIP software, and the nature of the job mix.) Higher values for the number of RIP nodes tend to slow the system slightly due to the burden of extra overhead (for example, for context switching), on a CPU-bottlenecked system.

The value of $\alpha$ used in the default setup is based on a set of master values that may be predetermined with respect to typical customer documents. This is used as one input to the calculation of the ideal RIP node count, PreferredRIPConfig. The number of compressor cards has a similar effect as the number of processors on the ideal number of RIP nodes. Hence, a second input to the calculation of PreferredRIPConfig is the number of compressor cards. The amount of memory available affects the maximum number of RIP nodes that may be active at a time without thrashing. These values are used in determining the value of N-WAY, which is greater than or equal to Preferred RIPConfig. The system determines values for N-WAY and Preferred RIPConfig, and uses them to determine MaxRIPs, which is a value indicative of the number of parallel RIP nodes in actual operation. In certain implementations, if any or all of these values are already defined in a configuration file, the system can determine whether N-WAY and Preferred RIPConfig match the values just calculated, and if they do not, it changes the values in the file. Second, if the value of MaxRIPs is defined, the system determines whether such value is less than N-WAY and if not, the value of MaxRIPs is set equal to N-WAY. If MaxRIPs is not defined, it is set to the value of PreferredRIPConfig.

Operator Interface to Above Features

At the Graphic User Interface (GUI), the operator is afforded the opportunity to review and alter the prerequisite conditions, for example, one or more of the values MaxRIPs, Preferred RIPConfig and N-WAY. For example, an operator may be allowed to change the positive integer value of MaxRIPs to anything not greater than N-WAY. In the preferred embodiment the system displays values of "Maximum", "Recommended" and "Allocated" parallel RIP nodes, with the "Allocated" value displayed in a field that the user may change (to a value not greater than the "Maximum"). These values correspond to the internal values MaxRIPs, PreferredRIPConfig and N-WAY. The GUI hides parallel RIP related parameters from the operator when parallel RIP processing is disabled (N-WAY=one).

Auto-Recovery in Serial Mode

A substantial fraction of the jobs are anticipated as being coded in the PostScript language. Most of these jobs will either be Document Structuring Conventions conformant (or close enough for the purposes of this system), or sufficiently non-conformant that the non-conformance can be detected immediately. Some jobs may fool the system enough to pass through the splitter 110 and fail during RIP processing. When a page being processed concurrently experiences faults, an auto recovery in serial mode procedure may be executed. In this auto recovery procedure all other pages in that job are purged from the system, a log message is written out in the error log for the respective job, and the job is sent to a single RIP node without being split. As a result, the job is processed serially, while other jobs are processed in parallel with it. If a page faults when a job is being processed serially, the job is then faulted without further processing. Those jobs that fault after having already printed one or more pages may be disqualified from auto-recovery.

Special Workflow to Enable Parallel RIP of Unprotected PostScript (PS) Jobs

Unprotected PS jobs operate in a special context in which any job may alter the state of the interpreter's virtual memory in such a way as to affect certain future jobs. Future jobs not affected are those that occur after a reboot or system crash or after another job undoes any changes to the interpreter's virtual memory. (After a reboot or system crash, the virtual memory will always be reset to a known state, and just as a job may alter the state, so may future jobs perform the reverse alterations). In a non-concurrent system, unprotected jobs operate in their own context—that is, there is a queue for unprotected jobs, and the unprotected jobs use a UNIX process to RIP node that is separate from the RIP node that runs protected jobs. The normal use of unprotected mode is to run a job that changes the state of virtual memory, and then to run one or more jobs that use the altered state of virtual memory. The RIP node processing stays active across jobs; a protected RIP node ensures that the state of virtual memory is restored to its standard state after each job is run.

To enable parallel processing of unprotected PostScript jobs in a page parallel system, the system requires a way of changing VM on all affected RIP nodes and a mechanism for using this set of RIP nodes in parallel. This is implemented in the present invention as two (mutually exclusive) user visible job attributes: Unprotected-Read-Write, and Unprotected-Read-Only. The implementation of Unprotected-Read-Only is the same as that for protected page parallel; jobs are split and chunks are fed independently to multiple RIP nodes in order to have their outputs collected and sequenced and sent to the printer; however, unprotected RIP nodes are used. Unprotected-Read-Write mode is implemented using redundant-mode processing, in which the entire job is sent concurrently to all unprotected RIP nodes, so that their virtual memory state is set accordingly. A password may be used to enforce virtual memory write permissions for Unprotected-Read-Only, so as to fault any read-only job that tries to write to virtual memory (this is the same mechanism used to enforce Read-only behavior in Protected queues). All RIP nodes preferably finish any prior jobs before they switch to Redundant Mode. All RIP nodes save one have their output disabled. If the jobs produce any output, only one copy will be printed. In this way, the speed of Unprotected-Read-Write jobs is no slower than had they been sent to a serial system, and their output is identical; while the speed of Unprotected Read-Only jobs will obtain the full benefit of parallelism.

Queue-Level Control Over Concurrent Processing

Because the handling of PostScript jobs depends on Document Structuring Convention (DSC) PostScript conformance, jobs from some sources may routinely fail. An operator may control whether or not concurrency is to be employed at the queue level. The system provides, at the graphical user interface, a check box or other means of controlling the properties of each queue. One such property is whether jobs submitted to this queue run concurrently (i.e. chunk-parallel) or serial. This queue-level control provides an operator the option of submitting certain jobs to a serial queue, such as jobs that could be expected to fail if run in a parallel mode. As a result, thus submitted jobs are guaranteed to run as well as on a serial system. This precludes the likelihood of splitting a job, and starting to RIP, with failure after the first few pages. Such queue level control also prevents the instance of a serial job being placed in a wait state until all of the RIP nodes are cleared, and then the system having to be placed in serial mode. Furthermore, with such queue level control, all of the RIP nodes are not required to be devoted to serial operation when a serial job is selected for processing.

Handling Both Serial and Concurrent Chunks Simultaneously

When a job is tagged as serial (either from its queue parameters or due to retry), it only uses one RIP node. The splitter continues to split additional jobs as it finds them in the queue(s) and remaining RIP nodes process the chunks belonging to the other jobs. This maximizes productivity. The alternative would be to have two modes and switch between them whenever a serial job starts or completes.

Flow Control Based on Available Buffer Space

The contemplated printing system is designed to appear to a print engine as a very fast serial job processing machine. Although multiple jobs may be in the system at any given time, jobs are reported as being completed according to the order of their submission. For example, in a system with ten RIP nodes, there could be three 2-page jobs in the system, as well as the last page of a 20-page job, plus the beginning of a subsequent job, all of such jobs having been split according to a single-page level of granularity. Depending on the chosen splitting parameters, there could be as many jobs as there are active RIP nodes, as well as an arbitrary number of jobs being "split ahead". Every job in the system uses space in VDISK. At a minimum, VDISK devotes space for storing split chunks; storage may also be devoted to pages completed out of order, or pages for jobs other than the first job due to be reported complete. Rather than have a fixed limit to the number of jobs in the system, the system includes a flow control limit that is based on the space available in VDISK. When the space consumed in VDISK is determined to exceed a threshold, new chunks may be disallowed by, for example, stopping the operation of the splitter. A splitter may be stopped by sending a pause message to it, or by withholding chunk destinations from it. A splitter only generates chunks when it has destinations for them, and it is the supervisor's responsibility to provide those destinations to the splitter. New jobs are then added to the system only as the splitter finishes the jobs it is already processing.

The printing system described herein may be implemented to include both page parallel processing, for a variety of languages, and chunk parallel processing, with chunks consisting of one or more pages, but not more than a single job per chunk. Data is thereby managed in a distributed system with minimal access to disk. As may be appreciated with respect to the embodiments described herein, print jobs are pipelined, which allows any given RIP node the opportunity to complete its assigned processing and to be assigned to another job, without waiting for the other RIP nodes to complete their tasks. The level of granularity of parallelism may be selectively varied according to factors such as priority of a job and the current or expected load on the print system. Single jobs can pass quickly through the printing system, even if the printing system is heavily loaded, by splitting such jobs at a fine grain and by preventing other jobs from using the requisite resources. Print system scheduling may be based on intelligent estimates of the work that is required not only for jobs already in progress but also upcoming jobs. The parameters used for such estimations may also be refined as the system continues to operate.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. A method of operating a printing system for parallel processing a print job with a plurality of processing nodes into a printer ready format for printing the print job, said processing nodes communicating with a virtual disk remote transfer system, comprising:

splitting the print job into a plurality of job chunks, wherein each of the plurality of chunks range in size from at least one page to the entire size of the print job, wherein pages comprising the chunks are selected in accordance with predetermined selection factors for optimizing page printing processing efficiency;

selectively storing the job chunks and print-ready pages in the virtual disk remote transfer system, wherein the virtual disk remote transfer system comprises an intermediary storage for data transfer to selected processing nodes including a RAM and a physical disk, and a transparent networked file system interface, and wherein the virtual disk remote transfer system is implemented by providing a shared memory interface;

assigning each of the plurality of job chunks to selected processing nodes for parallel processing the job chunks into the printer-ready format;

monitoring available space in the virtual disk remote transfer system including detecting a data overflow in the RAM and storing new data in the physical disk until data storage in the RAM is available;

selectively blocking reads of the job chunks and print ready data stored in the virtual disk remote transfer system until receipt of an end of file signal; and printing the print job.

2. The method defined in claim 1, further comprising preventing selected chunks from being added to the virtual disk remote transfer system when the monitored available space falls below a predetermined threshold representative of the overflow.

3. The method defined in claim 2, wherein the splitting is performed by a splitter and further comprising withholding chunk destinations from the splitter.

4. The method of claim 1 further including paging out the chunks of data from the virtual disk remote transfer system in a most-recently used order, wherein a least recently-used chunk is read soonest.

5. The method of claim 1, wherein the predetermined factors used to determine the size of the print job further includes the total number of pages within the print job.

6. The method of claim 1, wherein the predetermined factors used to determine the size of the print job further includes the total number of bits within the print job.

7. The method of claim 1, wherein the predetermined factors used to determine the size of the print job further includes the total amount of processing required to process the job.

8. The method of claim 1, wherein the predetermined factors used to determine the size of the print job further includes the amount of startup time needed to set up the job.

9. The method of claim 1, wherein the predetermined factors used to determine the size of the print job further includes number of pages containing non-text images contained in the print job.

10. The method of claim 1, wherein the predetermined factors used to determine the size of the print job further includes number of pages containing color in the print job.

11. The method of claim 1, wherein separate print queues are defined as protected postscript or not protected postscript.

12. The method of claim 1, wherein the parallel processing system records the previous predetermined selection factors and uses statistical analysis to determine the optimal size of chunks.

13. The method of claim 1, wherein the parallel processing system incorporates load balancing to spread the workload out evenly among associated print devices.

14. The method of claim 1, wherein the parallel processing system incorporates auto discovery to evaluate the availability of hardware resources.

15. The method of claim 1, wherein the splitting functionality may have user selected status of maximum, recommended, and allocated.

16. A method of operating a printing system for parallel processing a print job with a plurality of processing nodes into a printer ready format for printing the print job, said parallel processing nodes communicating with a virtual disk remote transfer system, comprising:

splitting the print job into a plurality of job chunks to be run separately over a plurality of parallel processors, wherein the sizes of the chunks are selected in accordance with predetermined selection factors for optimizing efficiency of the parallel processing printing;

selectively storing the job chunks and print-ready pages in the virtual disk remote transfer system, wherein the virtual disk remote transfer system comprises an intermediary storage for data transfer to selected processing nodes including a RAM and a physical disk, and a transparent networked file system interface, and wherein the virtual disk remote transfer system is implemented by providing a shared memory interface;

paging out the chunks of data from the virtual disk remote transfer system in a most-recently used order, wherein a least recently-used chunk is read soonest;

assigning each of the plurality of job chunks to selected processing nodes for parallel processing the job chunks into the printer-ready format;

monitoring available space in the virtual disk remote transfer system including detecting a data overflow in the RAM and storing new data in the physical disk until data storage in the RAM is available;

selectively blocking reads of the job chunks and print ready data stored in the virtual disk remote transfer system until receipt of an end of file signal; and printing the print job.

17. The method of claim 16, wherein the parallel processing comprises at least three processors connected to at least three separate memories.

18. The method of claim 16, wherein the parallel processing is implemented in symmetric multiprocessing wherein two or more processors can connect to a single shared main memory.

19. The method of claim 16, wherein the parallel processing is implemented in distributed multiprocessor.

20. A method of operating a printing system for parallel processing comprising the steps of:

inputting a print job;

storing the print job in a spooling system;

determining the language, size and location of the print job;

advising a supervisor to select splitter;

advising splitter of job location and chunk parameters;

assigning chunk to rasterized image processor (RIP) nodes;

splitting the job into chunks;

selectively storing the job chunks in a virtual disk remote system for intermediary storage for data transfer to selected processing nodes, said system providing a shared memory interface and a transparent networked file system interface;

selectively blocking reads of the job chunks and print ready data stored in the virtual disk remote transfer system until receipt of an end of file signal;

sending chunks to RIP node;

maintain chunk order by collector;

advising supervisor of chunk completion by splitter;

advising collector of page to chunk association;

parallel processing of chunks by RIP nodes;

advising supervisor and collector that chunk processing completed;

sending rasterized chunks to memory;

completing print job by splitter; and advising supervisor of end-of-job by collector.

* * * * *